United States Patent [19]
Galbarini et al.

[11] 3,748,053
[45] July 24, 1973

[54] SUSPENSION DEVICE FOR THE HEADSTOCK OF A MACHINE TOOL

[75] Inventors: Maso Galbarini, Pavia; Francesco Cotta Ramusino, Milan, both of Italy

[73] Assignee: Innocenti Societa Generale Per L'Industria Metallurgica & Meccanica, Milan, Italy

[22] Filed: Sept. 21, 1971

[21] Appl. No.: 182,437

[30] Foreign Application Priority Data
Apr. 29, 1971 Italy.............................. 68419 A/71

[52] U.S. Cl...................... 408/234, 90/15, 90/11 R
[51] Int. Cl............................................. B23b 47/26
[58] Field of Search......................... 408/234, 235; 90/DIG. 28, 11 R, 15, 16

[56] References Cited
UNITED STATES PATENTS
3,010,713  11/1961  Turkovich...................... 408/234 X
2,899,869  8/1959  Daugherty .................... 90/DIG. 28

*Primary Examiner*—Gil Weidenfeld
*Attorney*—Sughrue, Rothwell, Mion, Zinn & Macpeak

[57] ABSTRACT

A large machine tool of the portal type is disclosed in which a headstock is carried by a headstock bearing carriage which slides along a horizontal guide member. The problem of errors due to deflections of the guide member under the weight of the headstock bearing carriage and headstock assembly are alleviated by mounting the headstock bearing carriage on two support beams over the guide member and suspending the headstock bearing carriage from the beams by means of two very strong springs. Thus the support beams normally support the weight of the assembly and the guide member supports no weight, merely serving as a guide; as the beams deflect under the weight of the assembly when the headstock is traversed across the guide member, however, some of the weight is transferred onto the guide member. Because of the strong springs, only part of the weight of the assembly is transferred so that the guide member does not have to carry the full weight of the assembly and this is not unacceptably deflected during a traverse of the headstock.

6 Claims, 4 Drawing Figures

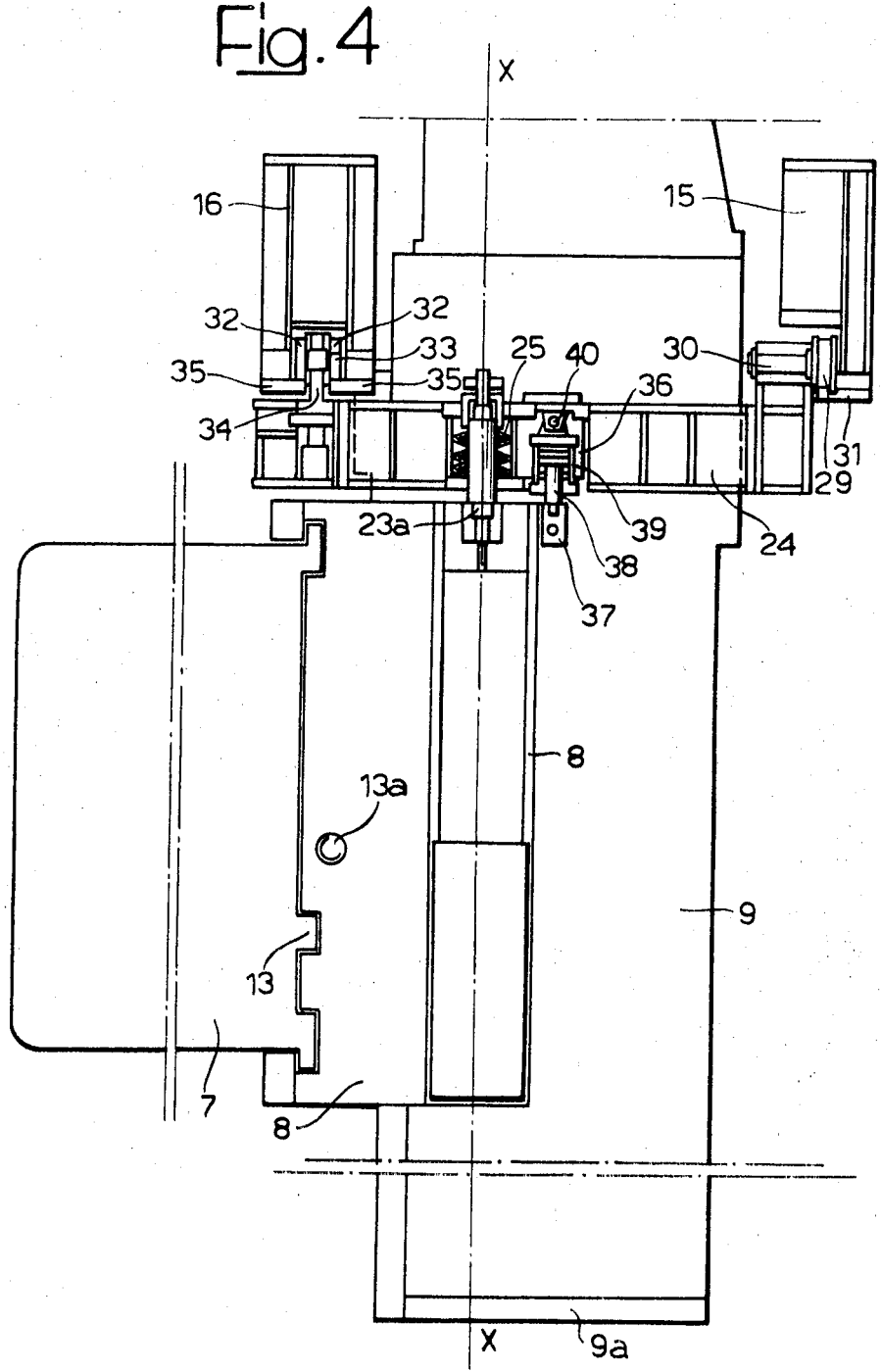

SUSPENSION DEVICE FOR THE HEADSTOCK OF A MACHINE TOOL

BACKGROUND OF THE INVENTION

The present invention relates to a device for suspending the headstock of a large machine tool of the portal type (either fixed or movable), which slides on a horizontal guideway.

In very large machine tools such as lathes or milling-boring tools of the fixed or movable portal type, the headstock to which the work tool or fitting is attached causes a deflection of the horizontal guideway due to its weight and that of the carriage to which it is joined, as it traverses across the guideway. This deflection gives rise to machining errors which are undesirable. Additionally deflection of the guideway along which the carriage too which the headstock is joined slides during a traverse of the headstock also induces local distortions in the said guides which can cause other disadvantages such as jamming during movement of the headstock bearing carriage.

In order to eliminate the disadvantage of deflection of the guideway several measures have already been suggested. One of these consists of a preventive distortion of the cross member on which the guideway is formed in the direction opposite to the distortion which would be caused by the weight of the headstock assembly comprising the carriage, the headstock and any associated fittings moving along the cross member. This measure however, does not provide a satisfactory solution to the problem because it is considerably laborious and somewhat inexact, and requires calculation and tests to ascertain the likely distortion of the cross member and then the pre-distortion of the cross member in the direction opposite to the expected distortion. Moreover, the measure referred to above does not allow the guides of the headstock-bearing carriage, which are fixed to the cross member to be unloaded, that is to act simply as guides and not support members.

In addition, for machines in which there are at least two, and perhaps more, headstocks sliding independently on respective carriages on the cross member, pre-distortion of the cross member cannot be used to correct for position errors since the distortion of the cross member varies continually depending on the various positions assumed by the various headstocks during a machining operation.

A further attempt to solve this problem has also been suggested; this consists of using the guideway on the cross member solely for guiding the headstock-bearing carriage, and resiliently suspending the carriage with its accompanying head by cables or the like from a saddle sliding upon a high beam placed parallel to, and above, the cross member. Similarly, this measure does not solve the problem completely and rationally, since, in a case in which a headstock has to make vertical movements of considerable length upon the headstock bearing carriage, as is frequently the case in modern machine tools of large dimensions of the portal type, the aforesaid measure would necessitate the setting up of structures above the machine, at excessive and unacceptable height, with the consequent constructional difficulties of such structures.

OBJECTS OF THE INVENTION

One object of this invention is to provide a suspension device for a headstock bearing carriage of a fixed or movable port-al type machine tool, which will allow the headstock to travel in a vertical direction to any reasonable extent without requiring structures of excessive height.

Another object of the invention is to provide a suspension device for a headstock-bearing carriage, which will allow the use of a number of tool carrying headstocks on the same cross member without the said cross member being subject to deflections which would cause errors in machining.

A further object of the invention is to provide a suspension device of the type aforementioned, which will allow effective unloading of the weight of the carriage and headstock bearing carriage from the guideway of the cross member.

SUMMARY OF THE INVENTION

According to the present invention a suspension device for supporting a headstock which is mounted in a headstock bearing carriage and guided by a horizontal guideway of a large machine tool of the portal type, comprises at least two support beams supported at each end substantially parallel to each other and to the said guideway, spaced by a distance substantially equal to the transverse dimension of the headstock and located above the said guideway, a sub-frame at least partly surrounding the headstock and slidably mounted upon guides on the said beams, and resilient suspension means for supporting the headstock bearing carriage on the sub-frame.

Further features and advantages of the invention will become apparent from a consideration of the following description given by way of non-restrictive example, with reference to the accompanying drawings, in which:

BRIEF DESCRIPTION OF THE DRAWINGS

FIG. 4 is a side view, partially in section of the suspension device of FIGS. 2 and 3.

DESCRIPTION OF THE PREFERRED EMBODIMENT

Figure 1:
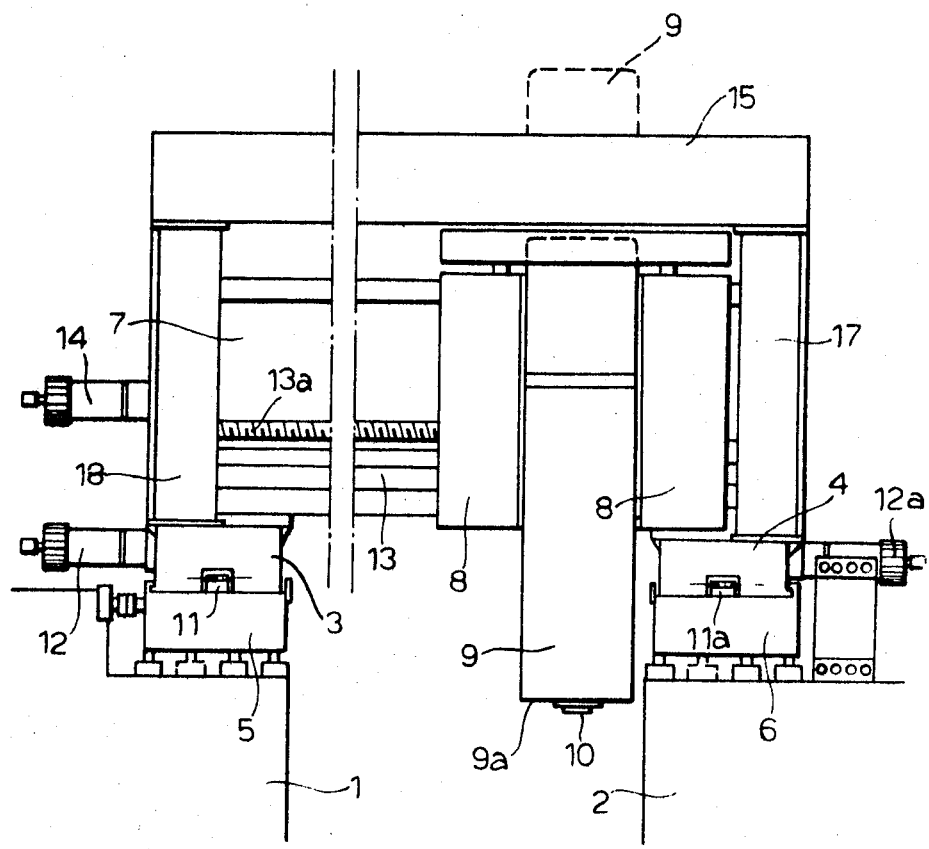
FIG. 1 is a diagrammatic front view of a machine tool of the movable portal type incorporating a device for suspension of the headstock constructed in accordance with the invention.

Referring now to the drawings, and in particular to FIG. 1, it will be noted that the machine tool includes base blocks 1 and 2, which define between them the zone in which the workpieces are placed. Two trolleys 3 and 4 slide horizontally upon respective longitudinal slideways 5 and 6 which are mounted on the said base blocks 1 and 2.

Upon the trolleys 3 and 4 is placed a horizontal cross member 7 bearing a guideway 13 upon which slides a carriage shown diagrammatically by the reference numeral 8. The carriage 8, in its turn, bears a headstock 9 mounted so as to be capable of performing substantially vertical excursions perpendicularly to the cross member 7.

The headstock 9 has a frontal plate 9a from which emerges a spindle 10 for carrying the tools or any fittings which may be connected to the frontal plate 9a, by any known method.

Movement of the trolleys 3 and 4 along the benches 5 and 6, is effected by known means such as the racks 11 and 11a, shown in the drawings, by means of motors 12 and 12a. On the other hand, movement of the carriages 8 along the guideway 13 on the cross member 7 is effected by means of a motor 14 which operates a lead screw 13a.

Figure 2:
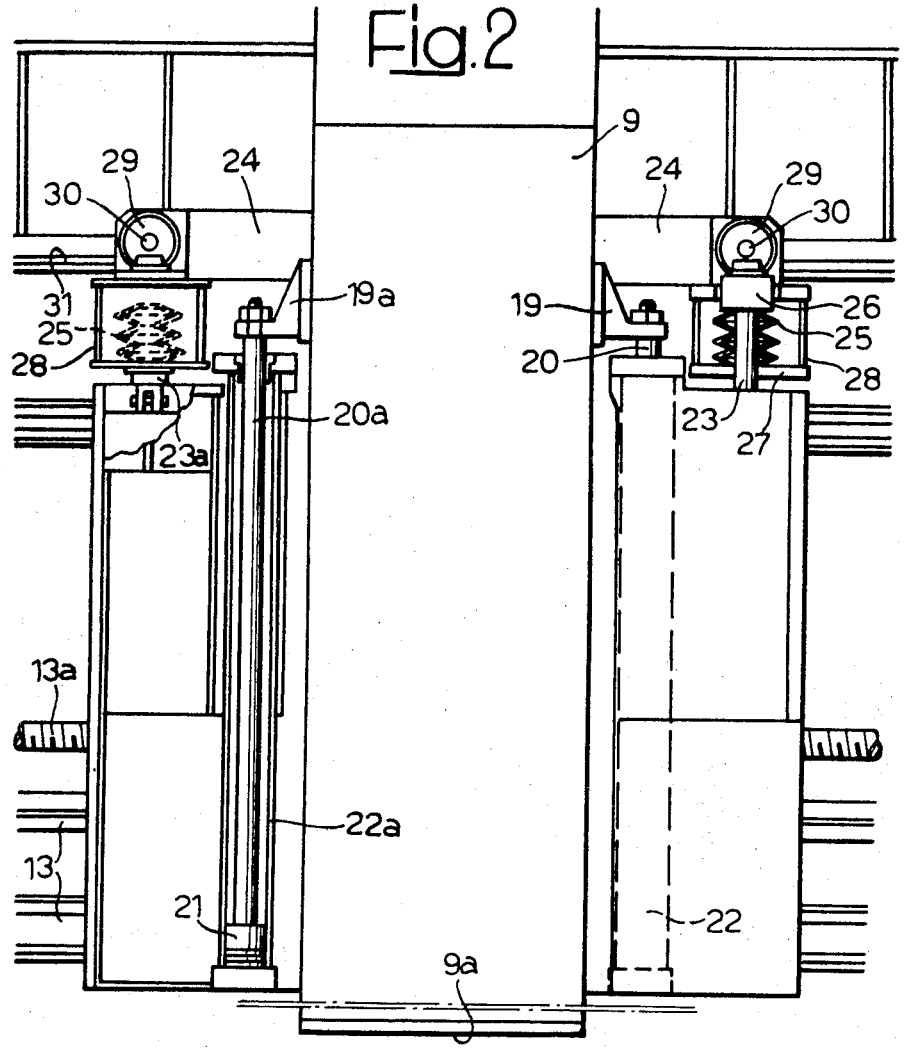
FIG. 2 is a front view, partially in section, of the suspension device for the headstock of the embodiment of FIG. 1.
Figure 3:
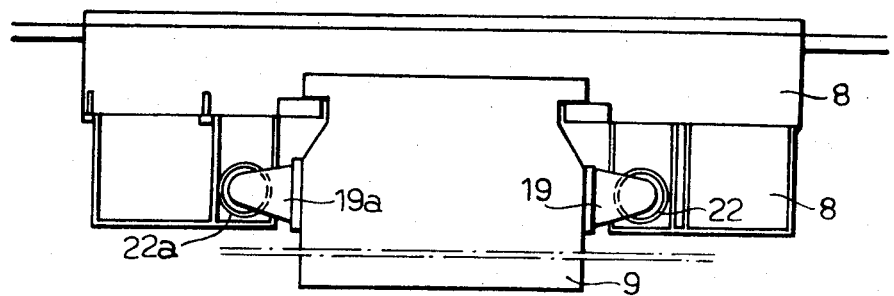
FIG. 3 is a view from above of the suspension device of FIG. 2.

Above the cross member 7 there are two support beams 15 and 16; the first, shown marked 15, is supported by the trolleys 3 and 4 by means of two uprights 17, 18, whilst the second rests on two end head pieces of the cross member 7, which in their turn rest on the trolleys 3 and 4. The carriage 8 is suspended from the said support beams 15 and 16 by means of the mechanism described below with reference to FIGS. 2, 3, and 4.

As will be seen from these Figures, the headstock 9 is connected, by means of two brackets 19 and 19a, to the piston rods 20 and 20a of pistons 21 which slide in respective hydraulic lifting cylinders 22 and 22a which are located laterally of the headstock 9 and mounted on the carriage 8. The cylinders 22 and 22a and rigidly connected to the carriage 8 by means not shown. It will be appreciated that extension and compression of the hydraulic cylinders 22 and 22a will effect raising and lowering of the headstock 9 with respect to the carriage 8.

The carriage 8 is suspended from two rods 23 and 23a to a frame 24 which peripherally surrounds the headstock 9 so as to allow it to move vertically through the frame. The rods 23, 23a are attached to the top of a pile of cup springs 25 by means of a headpiece 26 of the rods 23 and 23a. The cup springs 25 are carried by a shelf 27 rigidly fixed to the lower portion of the frame 24. The shelf 27 has side walls 28 which, in effect, constitute a box in which the springs 25 are housed.

The frame 24 is provided with rollers 29 assembled on pins 30: these rollers 29 roll on a guide 3 mounted on the support beam 15. The frame 24 is also provided with rollers 32 assembled on pins 33 to which the frame 24 is connected by means of a suspension arm 34. The rollers 32 run on a guide 35 rigidly attached to the other support beam 16.

It should be noted that the axis X—X of each of the suspension rods 23 and 23a lies on a vertical plane passing through the centre of gravity of the carriage-headstock assembly, so that the resultant of the forces generated by the springs 25 coincides, in practice, with the barycentre of this assembly.

The suspension device also includes an auxiliary suspension member 36 between the carriage 8 and the frame 24; this auxiliary member 36 is arranged to compensate for the weight of any fittings attached to the frontal plate 9a of the headstock 9, and consists of a small lug 37 integral with the carriage 8 to which is anchored the piston rod 38 of a hydraulic cylinder 39 which is attached, in its turn, by means of the pivot 40, to the frame 24.

The cylinder 39 can be fed with hydraulic fluid to create a force corresponding to the weight of the fittings, and its line of operation is arranged to coincide substantially with the vertical barycentre of the fittings to be applied to the headstock 9. In this latter case the resultant of the forces generated by the springs 25 and by the cylinder 39 passes substantially through the new barycentre thereby taking into account the weight of the fitting added to the headstock 9.

OPERATION

The method of operation of the device is as follows:

The weight of the carriage 8 and of the headstock 9 acts upon the pile of cup springs 25 by means of the suspension rods 23 and 23a. The reaction of these springs is transferred to the frame 24, and from this the force is transmitted on to the balancing beams 15 and 16. When the carriage 8 with its headstock 9 is traversed across the guideway 13 the deflections of the beams 15 and 16 due to the weight of the carriage 8 and the headstock 9 are compensated by corresponding distortion of the springs 25, with the result that the cross member 7, upon which the carriage 8 slides, is not significantly deflected.

The guides 13, on the other hand are substantially free from the forces and moments due to the weight of the carriage 8 and of the headstock 9 (with or without fittings) and thus the carriage 8 is guided to move in an accurately rectilinear path.

Raising and lowering the headstock 9, vertically, that is perpendicularly to the cross member 7, can be effected simply and without any need for superstructures to the machine tool of substantial height; in fact the suspension of the carriage 8 with its headstock 9 on the support beams 15 and 16 can be formed close to the cross member 7 of the carriage by virtue of the sub-frame 24 which peripherally surrounds the headstock 9, and which encloses sufficient space to allow the passage of the headstock during the lowering and raising movements.

When a fitting is attached to the headstock 9, the further added weight of the fitting is compensated by the adjustable hydraulic cylinder 39, the force of operation of which is added to that of the springs 25 to provide a resultant force the line of action of which passes substantially through the barycentre of the assembly comprising the carriage 8, the headstock 9 and the fitting (not shown).

The embodiment described is a machine with only one headstock; the invention is not, however, restricted to this embodiment since same ideas can be used for any number of further headstocks which the machine may possess.

Various alternative embodiments are possible, all nevertheless remaining within the scope of the same inventive idea. For example, the sub-frame 24 which in the embodiment shown in the drawing surrounds the headstock 9 on all four sides, could also be formed by means of a C-shaped structure surrounding the headstock only on three sides. Alternatively the frame 24 could take the form of two cross members located laterally of the headstock 9 and resting at their ends upon the support beams 15 and 16. Similarly, the springs 25, whichh are in the form of Belleville washers in this embodiment, could be replaced by hydraulic or pneumatic cylinders.

In a further embodiment of the invention (not illustrated), the support beams 15 and 16, instead of being carried by the trolleys 3 and 4 of the cross member 7 by means of the uprights 17 and 18, could be supported by independent uprights, bearing directly upon the base of the machine in the case of a fixed portal type machine, or else bearing upon horizontal sliding guides independent of the sliding guides of the cross member 7 in the case of a sliding portal machine.

Finally, the dimensions and the materials can be of any suitable type according to requirements, without nevertheless going beyond the scope of the invention as described above and hereinafter claimed.

What is claimed is:

1. In a machine tool of the type having a horizontal headstock guideway,
    a headstock bearing carriage constrained to move along said horizontal headstock guideway,
    a headstock mounted on said headstock bearing carriage,
    the improvement comprising a headstock support device having at least two support beams, said support beams being,
    a. supported at each end and arranged substantially parallel to each other and to said horizontal headstock guideway,
    b. spaced by a transverse distance substantially equal to the transverse dimension of said headstock, and
    c. located above said headstock guideway,
    at least one guide on each of said beams, a sub-frame at least partly surrounding said headstock, said sub-frame being slidably mounted on said guides on said beams, and
    resilient suspension means supporting said headstock bearing carriage on said sub-frame.

2. The headstock support device of claim 1 wherein said resilient suspension means comprise:
    at least one rod rigidly connected at one end to said headstock bearing carriage,
    a spring assembly carried by said sub-frame,
    said spring assembly resiliently supporting the other end of said rod.

3. The headstock support device of claim 1 wherein said resilient support means comprises hydraulic cylinders interposed between said headstock bearing carriage and said sub-frame.

4. The headstock support device of claim 1 wherein said resilient suspension means includes an auxiliary hydraulic means interposed between said headstock bearing carriage and said sub-frame,
    the force generated by said auxiliary hydraulic means being adjustable in dependence on the weight of any fittings attached to said headstock,
    said auxiliary hydraulic means being located such that its line of action passes through the barycentre of any fitting attached to said headstock.

5. The suspension device of claim 4 wherein said resilient suspension means and said auxiliary hydraulic means are positioned such that the line of action of their resultant force passes through the centre of gravity of the assembly comprising said headstock bearing carraige, said headstock, and any fitting attached thereto.

6. The suspension device of claim 1 wherein said sub-frame has a rigid quadrilateral shape which surrounds said headstock such that said headstock can slide vertically up and down with respect to said sub-frame,
    said sub-frame being provided with rollers for movement along said guides on said support beams.

* * * * *